(12) United States Patent
Barber et al.

(10) Patent No.: US 7,797,396 B2
(45) Date of Patent: Sep. 14, 2010

(54) NETWORK ATTACHED STORAGE (NAS) SERVER HAVING A PLURALITY OF AUTOMATED MEDIA PORTALS

(75) Inventors: Michael J. Barber, Fort Collins, CO (US); William G. McCollom, Fort Collins, CO (US); Fred C. Thomas, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 505 days.

(21) Appl. No.: 11/669,043

(22) Filed: Jan. 30, 2007

(65) Prior Publication Data

US 2008/0183836 A1  Jul. 31, 2008

(51) Int. Cl.
*G06F 15/13* (2006.01)
(52) U.S. Cl. .................. 709/216; 709/223; 709/245; 455/436
(58) Field of Classification Search ............. 709/216, 709/223, 245; 455/436
See application file for complete search history.

(56) References Cited

U.S. PATENT DOCUMENTS

| 6,757,783 | B2 * | 6/2004 | Koh .................. 711/115 |
| 7,010,657 | B2 * | 3/2006 | Lowe et al. .......... 711/165 |
| 7,031,708 | B2 * | 4/2006 | Sarkkinen et al. ..... 455/436 |
| 7,467,400 | B1 * | 12/2008 | Moss et al. ............ 726/3 |
| 2002/0147797 | A1 | 10/2002 | Paul |
| 2003/0079016 | A1 | 4/2003 | Tsao |
| 2003/0105830 | A1 * | 6/2003 | Pham et al. ........... 709/216 |
| 2004/0103288 | A1 * | 5/2004 | Ziv et al. .............. 713/185 |
| 2004/0199719 | A1 | 10/2004 | Valin |
| 2004/0213273 | A1 | 10/2004 | Ma |
| 2005/0108430 | A1 * | 5/2005 | Howarth et al. ........ 709/245 |
| 2007/0016667 | A1 * | 1/2007 | Fujimoto et al. ....... 709/223 |

OTHER PUBLICATIONS

Bigelow, Stephen J.; "NAS", SearchStorage.com, Jun. 8, 2006, pp. 1-5, http://searchstorage.techtarget.com/originalContent/0,289142,sid5_gci1153587_tax30261... Oct. 4, 2006.

* cited by examiner

*Primary Examiner*—Jinsong Hu

(57) ABSTRACT

According to one embodiment, a system comprises a network attached storage (NAS) server not having a general-purpose user input device. The NAS server comprises local data storage and a plurality of automated media portals each operable for receiving a direct communicative coupling of a portable storage media and reading data from the received portable storage media for storage to the local data storage. According to another embodiment, a method comprises receiving a direct communicative coupling of a portable storage media to any of a plurality of different automated media portals of a NAS server, wherein the NAS server comprises local data storage and wherein the NAS server does not include a general-purpose user input device. The NAS server reads data from the received portable storage media, and the NAS server stores the data to the local data storage.

20 Claims, 4 Drawing Sheets

NETWORK ATTACHED STORAGE (NAS) SERVER HAVING A PLURALITY OF AUTOMATED MEDIA PORTALS

CROSS-REFERENCE TO RELATED APPLICATIONS

Not applicable.

TECHNICAL FIELD

The below description relates generally to data storage, and more particularly to network attached storage (NAS) servers having a plurality of automated media portals.

BACKGROUND

Network attached storage (NAS) servers are becoming increasingly prevalent. NAS servers generally include local data storage to which data can be stored. The NAS servers are communicatively coupled to a communication network such that other computing devices coupled to the communication network are capable of accessing the data stored to the NAS servers. In general, NAS refers to a class of dedicated hard disk-based storage devices. A NAS server provides users with additional disk storage available (e.g., via a local-area network (LAN) or other network) through a standard network connection. In most cases, a NAS server receives an internet Protocol (IP) address, connects to the network (e.g., LAN) through an Ethernet cable, and resides on the network as an independent network device. NAS servers can also be included as part of a storage area network (SAN). Although IP is the most common protocol, NAS products frequently support other network protocols, including IPX and NetBEUI as examples. NAS servers can share and exchange files using well-established protocols like NFS or the CIFS open standard, as examples.

Thus, a NAS server may effectively provide a central repository for data that is accessible by a plurality of computing devices coupled to the communication network, which may enable improved management of data storage. For example, absent a NAS server data may be stored to ones of a plurality of computing devices coupled to a communication network, which may result in difficulty and/or inefficiency in finding the location of desired data (e.g., determining on which of the computing devices the data resides). By storing the data to a NAS server, the plurality of computing devices can all access the data from the central repository provided by the NAS server.

Such NAS servers are used not only within companies, web servers, and other traditional environments in which storage of large amounts of data is commonly desired, but are also being used within users home environments. For instance, home-centric NAS servers may be employed to enable a user to store data to such NAS server that is coupled to the user's home network, and then the user can access the data stored to the NAS server from any of a number of different computing devices that are also coupled to the user's home network. In some cases, a general-purpose computer, such as a personal computer (PC), may be implemented as a NAS server on a network. In many instances, however, the NAS server is not a general-purpose computing device, such as PC, laptop, etc., but is instead a dedicated storage server that does not include general-purpose user input devices, such as a keyboard, and/or may not include output devices. That is, NAS servers may be available that are implemented as storage "boxes" that can be coupled to a user's network (e.g., home network) and that do not include general-purpose input and/or output devices (e.g., display). Such a NAS server that does not include general-purpose input and/or output devices may be desirable for a variety of reasons, such as to minimize cost of the NAS sewer to a user, minimize size of the NAS server and/or space required for implementing the NAS server, etc.). Rather than requiring such a general-purpose input and/or output device coupled directly to the NAS server, users often use other general-purpose computing devices that are coupled to the network, such as PCs, laptops, etc., in order to manage data stored to the NAS server. That is, users generally interact with a NAS server via other computing devices coupled to the network, rather than interacting directly with the NAS server. For instance, a user desiring to store data to a home-centric NAS server may interact with a PC (or other general-purpose computing device) that is coupled to the user's home network and load the data onto the PC; and then the user may further interact with the PC to transfer the data over the user's home network to the NAS server for storage to the NAS server. Thereafter, the user may use the PC or any other computing device coupled to the user's home network to access the data stored to the NAS server.

Portable data storage media are very popular today. Examples of such portable data storage media include, without limitation, CompactFlash cards, SmartMedia cards, MultiMediaCard, Secure Digital, MemoryStick, universal serial bus (USB)-interfaced devices, etc. For example, most digital images are stored on portable data storage media that are inserted into cameras. Examples of media types commonly used in digital cameras include, without limitation, Compact Flash, SmartMedia Cards, and Memoir Sticks. A user can remove the portable data storage media from the camera and couple it to a computer that has expansion slots for reading the media, or to a photosmart printer that includes expansion slots for reading the different types of media. The data (e.g., digital images) can be transferred from the portable data storage media to the computer to which it is coupled for storage locally on such computer.

General-purpose computing devices, such as PCs, commonly include a number of different types of interfaces for receiving different types of portable data storage media, such as CompactFlash cards, SmartMedia cards, MemoryStick, USB-interfaced storage, etc. As mentioned above, NAS servers are becoming more prevalent and thus users often desire to store data to a NAS server. Traditionally, to get the data from a portable data storage media onto a NAS server, a user must first couple the portable data storage media to a general-purpose computing device (e.g., PC) that includes an appropriate interface for the portable data storage media, and then use such general-purpose computing device to select the data on the portable data storage media that is desired to be stored to the NAS server and then transfer the selected data from the general-purpose computing device over the network to the NAS server.

Accordingly, many general-purpose computing devices, such as PCs, have media expansion slots that allow the user to couple portable data storage media (e.g., from their digital cameras) to their general-purpose computing device, and then interact with the general-purpose computing device to transfer the data onto a NAS server. Generally, the user must first copy the desired data from the portable data storage media onto the general-purpose computing device (e.g., PC) as an intermediate step, and then select which data (e.g., which images) to copy to the NAS server. This has the disadvantage of being undesirably inefficient and requiring a user to move the data twice (e.g., first from the portable data storage media to the PC and then from the PC to the NAS server). In practice, difficulty commonly arises because many times when a portable data storage media becomes filled, a user will download its data onto any (e.g., randomly selected) client PC on a network, and the user may then forget on which client they downloaded particular data (e.g., a particular set of images). Other times it becomes an issue as to exactly where on that client PC the folder with the desired data (e.g., images) is located.

DETAILED DESCRIPTION

Figure 1:
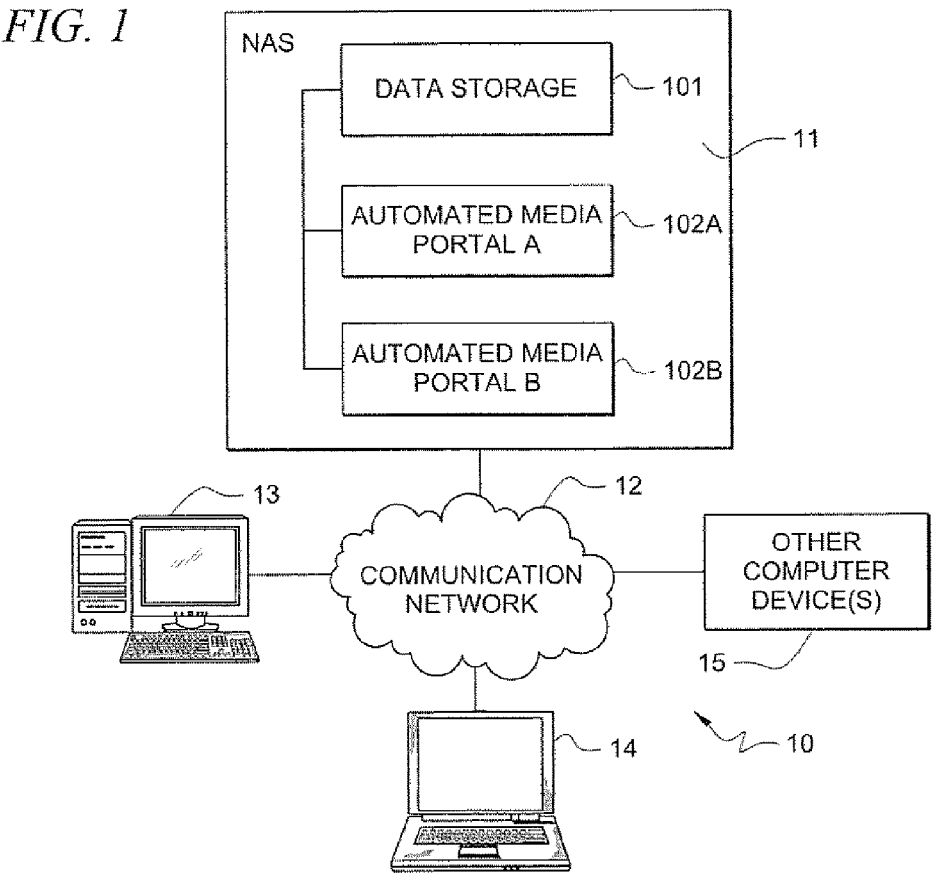
FIG. 1 shows an exemplary system according to one embodiment of the present invention.

FIG. 1 shows an exemplary system 10 according to one embodiment of the present invention. System 10 comprises a network attached storage (NAS) server 11 that includes local data storage 101 and is communicatively coupled (e.g., via Ethernet or other suitable connection) to communication network 12, which may be a local-area network (LAN), the Internet or other wide-area network (WAN), a wireless communication network, a public-switched telephony network (PSTN), any combination of the foregoing and/or any other communication network now known or later developed that permits two or more computing devices to communicate with each other. Local data storage 101 is generally implemented as a hard disk-based storage device, such as a Small Computer System Interface (SCSI) drive(s) and/or serial advanced technology attachment (ATA) drive(s), and may additionally or alternatively include other types of local data storage. Other computing devices, such as a personal computer (PC) 13, laptop 14, and/or other computing device(s) 15 may be communicatively coupled to NAS server 11 via communication network 12 such that those computing devices may be capable of accessing (e.g., reading from, writing to, etc.) data stored to the local data storage 101 of NAS server 11.

According to embodiments of the present invention, the NAS server 11 includes a plurality of automated media portals, such as automated media portals 102A and 102B, that provide hardware interfaces for communicatively coupling with a portable data storage media. While two exemplary media portals are shown in the example of FIG. 1 for ease of discussion, it should be recognized that more than two of such media portals may be included in a given implementation. The automated media portals are each capable of receiving a direct communicative coupling of a portable storage media. For instance, the automated media portals may provide suitable hardware interfaces for receiving any number of different portable data storage media, such as CompactFlash, MemoryStick, MultiMediaCard, Secure Digital, SmartMedia, USB, and/or other interfaces. Also, in certain embodiments, the automated media portals 102A and 102B each provide different hardware interfaces. For instance, automated media portal 102A may provide a hardware interface for direct communicative coupling with one of CompactFlash, MemoryStick, MultiMediaCard, Secure Digital, SmartMedia, USB, or other type of portable data storage media, while automated media portal 102B provides a hardware interface for direct communicative coupling with a different one of CompactFlash, MemoryStick, MultiMediaCard, Secure Digital, SmartMedia, USB, or other type of portable data storage media. Again, any number of such automated media portals may be implemented on NAS server 11 in a given embodiment, and thus hardware interfaces for any number of different types of portable data storage media may be provided by such automated media portals.

As described further herein, according to embodiments of the present invention, the NAS server 11 does not include a general-purpose user input device, such as a keyboard. In certain embodiments, NAS server 11 does not include any user input device, and may not include a suitable interface for a general-purpose user input device. In other embodiments, NAS server 11 does not include any general-purpose user input device, but may include a limited-purpose user input device, such as a button, that is limited in purpose to triggering transfer of data from a portable data storage media that is coupled to an automated media portal to the NAS server's local data storage 101.

For example, NAS server 11 may be implemented as a NAS server "box" that does not include a general-purpose user input device. Instead, as mentioned above, a user may manage data on the NAS server 11 via another computing device coupled to the communication network 12, such as one of PC 13, laptop 14, and/or other computing device(s) 15. Further, according to certain embodiments of the present invention, automated media portals 102A and 102B are capable of receiving a direct communicative coupling of a portable storage media, reading data from such received portable storage media, and storing the read data to local data storage 101 without requiring use of a general-purpose user input device to the NAS server 11.

In this manner, the media portals are referred to herein as "automated" media portals because a general-purpose user input device is not required in order to enable transfer of data from a portable data storage media to the local data storage 101 of NAS server 11. For instance, as discussed further herein, in certain embodiments the automated media portals are operable to read data from a portable data storage media and store such data to local data storage 101 responsive to the portable data storage media being communicatively coupled to the automated media portal. That is, coupling the portable data storage media to the automated media portal may, in certain embodiments, trigger reading of data from the portable data storage media for storage to local data storage 101. In other embodiments, a limited-purpose user input device, such as a button, may be included with the automated media portal to enable a user to trigger reading of data from a portable data storage media for storage to local data storage 101. That is, such a limited-purpose user input device may be limited in functionality to enabling a user to trigger reading of data from a portable data storage media for storage to local data storage 101.

Traditionally, NAS servers do not include a plurality of different automated media portals, such as automated media portals 102A-102B of FIG. 1. As discussed above, when a NAS server 11 that does not include a general-purpose user input device is implemented on a network, users traditionally couple portable data storage media to a general-purpose computing device (e.g., PC 13), transfer the data from the portable data storage media to the general-purpose computing device, and then interact with the general-purpose computing device to transfer the data over a communication network 12 to a NAS server. Embodiments of the present invention alleviate the problems, including the inefficiency, associated with such traditional techniques. For instance, because NAS server 11 includes automated media portals 102A-102B, data stored to a portable data storage media that a user desires to store to NAS server 11's local data storage 101 can be so stored to local data storage 101 by interacting directly with NAS server 11. That is, the portable data storage media can be communicatively coupled directly to an appropriate one of the automated media portals 102A-102B, and the desired data can be read from such portable data storage media and stored to local data storage 101. As mentioned above, such reading and storing may be performed automatically responsive to the portable data storage media being inserted to the automated media portal, or a limited-purpose user input device (e.g., button) may be used for triggering such reading and storing.

In certain embodiments, NAS server 11 includes a plurality of different automated media portals (e.g., media portals 102A-102B) each providing a different hardware interface for enabling direct communicative coupling with a different type of portable data storage media. Thus, great flexibility may be afforded by the NAS server 11 in that it is capable of receiving any of a plurality of different types of portable data storage media, and improved efficiency may be afforded by the NAS server 11 in that the automated media portals enable data to be read from a portable data storage media for storage to local data storage 101 directly at NAS server 11, rather than requiring the traditional intermediate steps of loading the data onto a general-purpose computer (e.g., PC 13) and transferring the data over network 12 to NAS server 11. Of course, it should be recognized that embodiments of NAS server 11 still support the capability of a user loading data onto a general-purpose computer (e.g., PC 13) and transferring the data over network 12 to NAS server 11, if so desired, but further enables the option of directly coupling a portable data storage media to an appropriate automated media portal (e.g., portal 102A-102B) of NAS server 11 for efficiently storing data from the portable data storage media to local data storage 101.

In certain embodiments, the NAS server 11 may be a home-centric NAS server that does not include an general-purpose user input device, but enables data to be stored to the NAS server 11's local data storage 101, wherein such data stored to the local data storage 101 can be accessed via other computing devices (e.g., computing devices 13-15 of FIG. 1) that are communicatively coupled to the user's home network (e.g., network 12). In this regard, data may be stored on NAS server 11 and accessed via any of a plurality of different computing devices communicatively coupled thereto, rather than storing data locally to individual computing devices 13-15. Furthers as mentioned above, embodiments of the present invention afford a user improved efficiency for loading data from a portable data storage media directly to NAS server 11 via an appropriate one of the plurality of different automated media portals 102A-102B. The automated media portals 102A-102B provide digital media interfaces that may be automated via detection of coupling to a portable data storage media (e.g., detection of insertion of a CompactFlash card, memory stick, etc.) or engagement of a button or other limited-purpose user input device for triggering transfer of data (e.g., digital assets, files, images, etc.) on the portable data storage media to appropriately shared folders on the NAS server 11. Certain embodiments of the present invention also eliminate the problem of not having a third-party device driver installed onto the NAS server that has support for reading media expansion slots.

Figure 2:
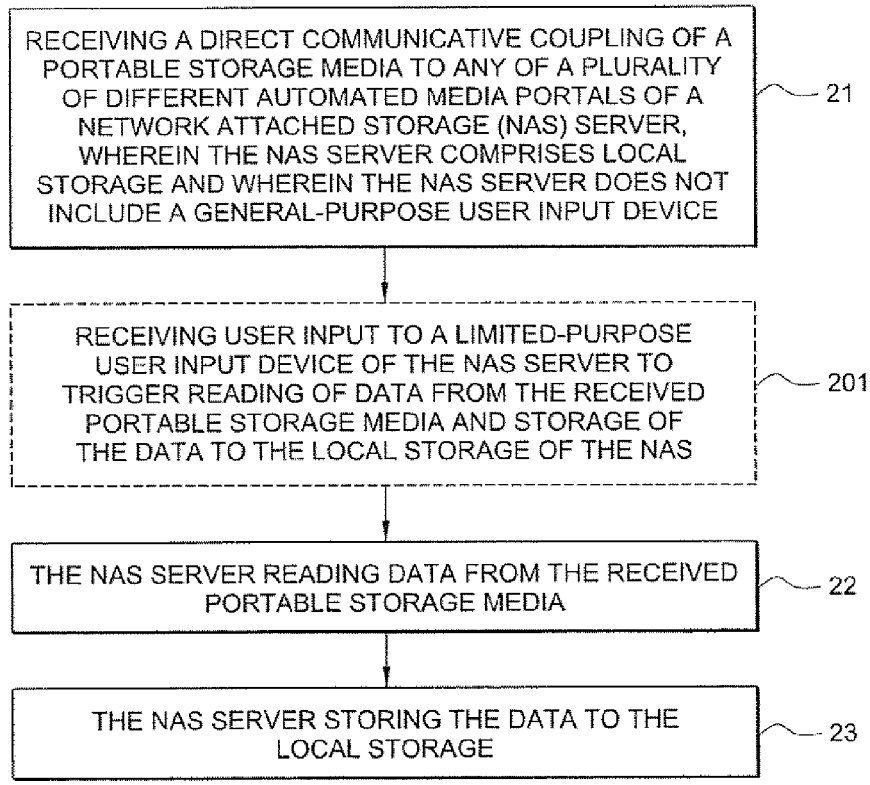
FIG. 2 shows an operational flow of one embodiment of the present invention.

Turning to FIG. 2, an operational flow of one embodiment is shown. In operational block 21, a direct communicative coupling of a portable storage media is received to any of a plurality of different automated media portals (e.g., portals 102A-102B of FIG. 1) of a NAS server (e.g., NAS server 11 of FIG. 1), wherein the NAS server comprises local storage (e.g., local storage 101 of FIG. 1) and wherein the NAS server does not include a general-purpose user input device. In certain embodiments, receiving a portable storage media to an automated media portal automatically triggers reading of data from the portable storage media and/or storing the read data to the NAS server's local data storage. That is, in certain embodiments, the NAS server does not require any user input to trigger storage of data from a portable storage media that is coupled to an automated media portal to the NAS server's local data storage. However, in certain embodiments, user input may be used to so trigger storage of data from a received portable storage media to the NAS server's local data storage. For instance, as shown in dashed (optional) block 201 of FIG. 2, user input may be received to a limited-purpose user input device of the NAS server to trigger reading of data from the received portable storage media and storage of the read data to the local storage of the NAS server. In block 22, the NAS server reads data from the received portable storage media. In block 23, the NAS server stores the read data to the local data storage of the NAS server.

Figure 3:
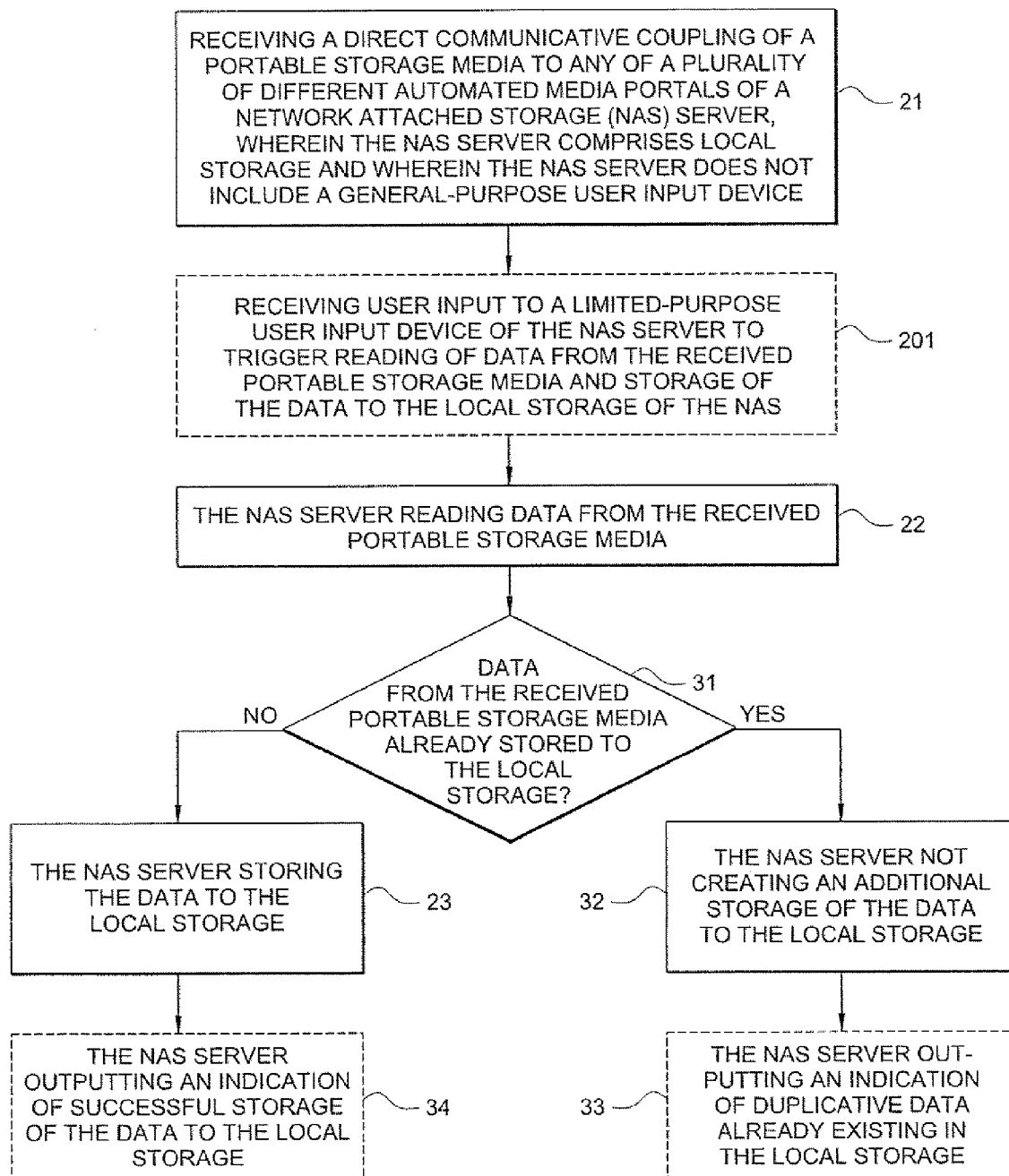
FIG. 3 shows an operational flow of another embodiment of the present invention.

FIG. 3 shows an operational flow of another embodiment. Operational blocks 21, 201, and 22 are included as described above with FIG. 2. According to this exemplary embodiment, in operational block 31, the NAS server determines whether data read from the received portable storage media is already stored to the NAS server's local data storage. If determined that the read data is not already stored to the NAS server's local data storage, then in block 23 the NAS server stores the read data to the local data storage. In certain embodiments, the NAS server may output an indication of successfully storing the data to the NAS server's local data storage in block 34, such as by illuminating a green light, outputting a successful message to a display, etc. If determined in block 31 that the read data is already stored to the NAS server's local data storage, then in block 32 the NAS server does not create an additional storage of the data to the local storage. For instance, a write of the read data to the NAS server's local data storage may be omitted (not performed), or the already stored data in the NAS server's local data storage may be overwritten with the read data such that a duplicate of the read data is not separately stored to the NAS server's local data storage. In certain embodiments, in block 33, the NAS server outputs an indication of duplicative data already existing in the local data storage of the NAS server, such as by illuminating a red light, outputting an unsuccessful message to a display, etc.

In certain embodiments, NAS server 11 may be pre-configured as to certain characteristics of storing data received via an automated media portal 102. That is, because a general-purpose user input device is not included on NAS server 11, various characteristics regarding data storage may be pre-configured. For instance, file naming conventions, storage location (e.g., to a pre-designated folder/directory within local data storage 101), and/or other storage characteristics may be pre-configured for a NAS server 11. For example, a user may configure such storage characteristics of NAS server 11 via another general-purpose computing device that is coupled to the communication network 12, such as via PC 13 of FIG. 1. As an example, NAS server 11 may be pre-configured to include a digital folder (or directory) within its local data storage 101 named "Transferred Data" to which all data received via an automated media portal 102 is stored. In this regard, a user knows where on the NAS server 11 such data may be later accessed (i.e., in the Transferred Data folder in this example), and a user may later use a general-purpose computing device, such as PC 13 of FIG. 1, to access the data and may move the data to a different location (e.g., to a different digital folder on NAS server 11) and/or re-name the data file, etc.

Alternatively, in certain embodiments, file folders which are indicative of the file type being transferred to the system via an automated media portal may be generated. In certain embodiments, a user may configure the system to generate such file folders that are indicative of the file type being transferred by selecting this option through the NAS administrative console software on a network client PC (e.g., on PC 13 of FIG. 1). As an example of operation of the system when configured in this manner, when the system recognizes that several JPEG (type of image file extension) files have been transferred via a media portal to NAS 11, the system would create a "JPEG Transferred Data" folder. Similarly, other file types, such as PDF, PowerPoint, DOC, etc., may be recognized and have separate file folders generated for automatic placement of corresponding types of files being transferred from an automated media portal. A general-purpose file repository folder may be included on the system, which may contain file types that do not reach a certain threshold count (say, 25) that would trigger system creation of a specific folder for that file type. Once the file count threshold is met over multiple transfers from different automated media portal data transfers, a specific file type folder may be generated mid files initially transferred into the general-purpose file repository folder would be automatically moved to the specific file type folder. In certain embodiments, a user (e.g., system administrator) may configure the file count threshold to be employed in this manner.

Figure 4:
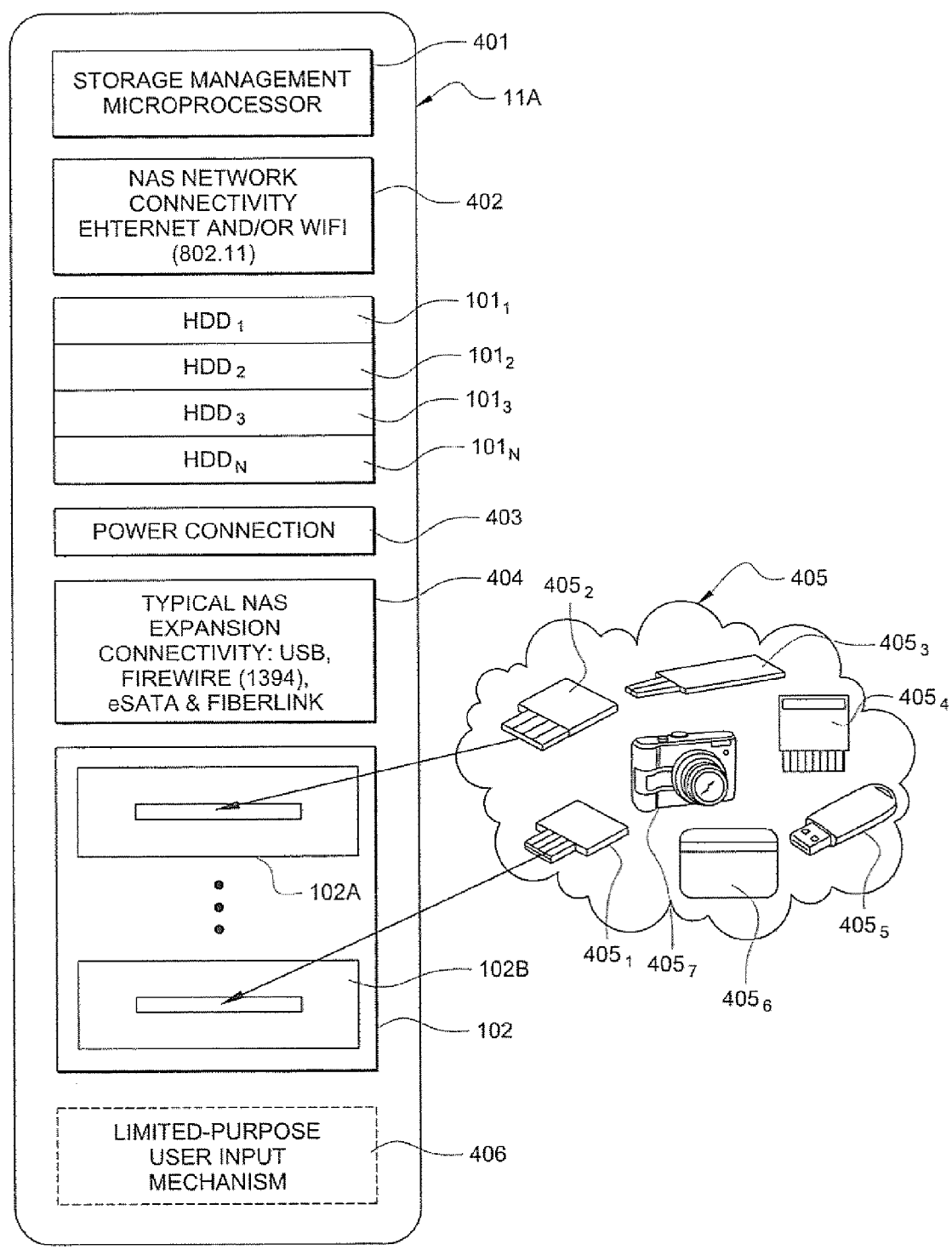
FIG. 4 shows an exemplary block diagram of one embodiment of a NAS server.

FIG. 4 shows an exemplary block diagram of one embodiment of a NAS server 11, shown as NAS server 11A. NAS server 11A includes a storage management microprocessor 401, such as AMD Sempron 3400 Dual Core as a non-limiting example, in a manner well known in the art. NAS server 11A further includes network interface 402, such as an Ethernet and/or WiFi (e.g., 802.11) interface, for communicatively coupling to a communication network, such as network 12 of FIG. 1. NAS server 11A also includes local data storage 101, which in this example includes any number "N" of hard disk drives 101$_1$-101$_N$. NAS server 11A also includes a power connection 403 in the manner well known in the art. And, NAS server 11A includes traditional NAS expansion connectivity, such as USB, Firewire (1394), eSATA, and FiberLink, as examples.

NAS server 11A also includes a plurality of automated media portals 102, such as automated media portals 102A and 102B described above. As described above, such automated media portals may each provide a different hardware interface for communicatively coupling to a different type of portable data storage media, such as the exemplary portable data storage media 405 shown in FIG. 4. The portable data storage media 405 shown in FIG. 4 includes the various different types of portable data storage media 405$_1$-405$_7$. Thus, any of such portable data storage media 405 may be coupled to the appropriate one of the automated media portals 102 to enable data stored to such portable data storage media to be stored to the local data storage 101 of NAS server 11A. In certain embodiments, a computing device, such as a digital camera 405$_7$ may be used to store data to a portable data storage media, such as a CompactFlash card, MemoryStick, etc., and then the portable data storage media may be coupled to an appropriate one of the automated media portals 102 to enable the data to be stored to the NAS server's local data storage 101. In this example, automated media portal 102B provides a hardware interface for coupling with a first type of portable data storage media 405$_1$, while automated media portal 102A provides a hardware interface for coupling with a different type of portable data storage media 405$_2$.

Also, in certain embodiments, a limited-purpose user input mechanism (e.g., button) 406 may be included on NAS server 11A. As mentioned above, such limited-purpose user input mechanism 406 may be limited in purpose to triggering transfer of data from a portable data storage media 405 that is coupled to an automated media portal 102 to the NAS server's local data storage 101.

Figure 5:
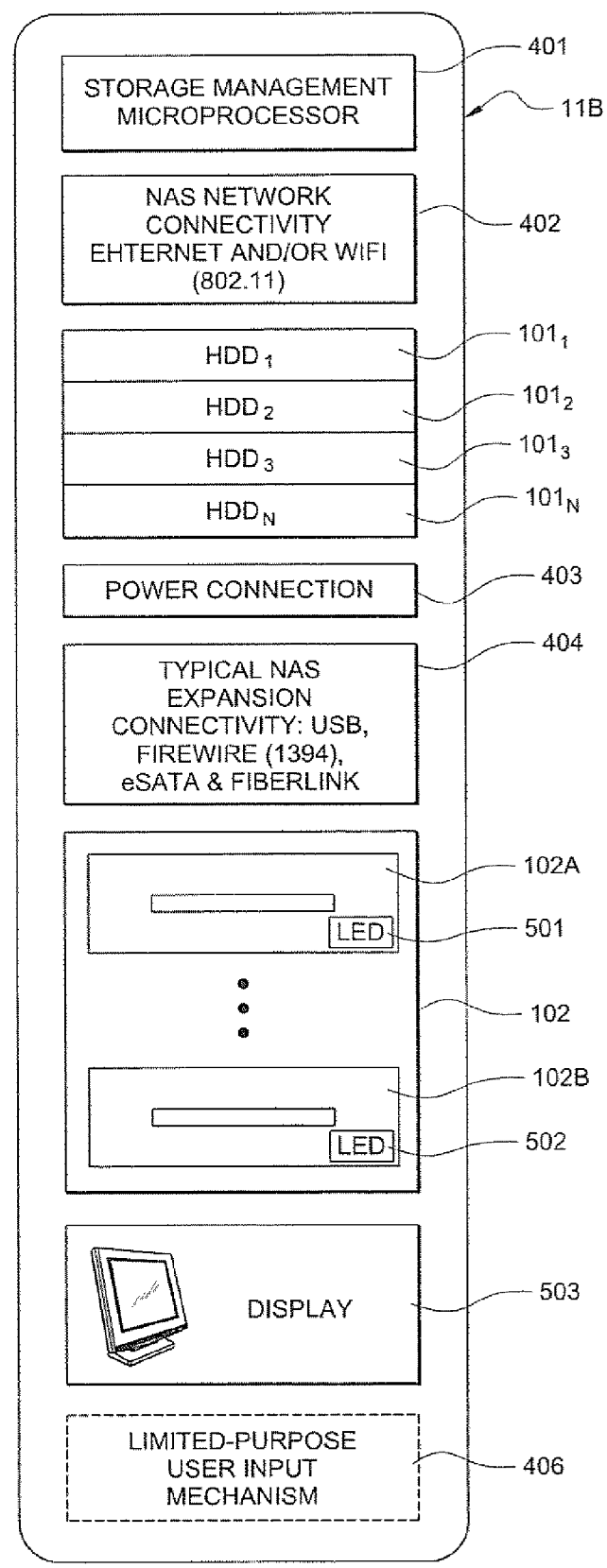
FIG. 5 shows an exemplary block diagram of another embodiment of a NAS server.

FIG. 5 shows an exemplary block diagram of another embodiment of a NAS server 11, shown as NAS server 11B. As with NAS server 11A described above with FIG. 4, NAS server 11B includes a storage management microprocessor 401, network interface 402, local data storage 101 (which in this example includes any number "N" of hard disk drives 101$_1$-101$_N$), a power connection 403, and traditional NAS expansion connectivity, such as USB, Firewire (1394), eSATA, and FiberLink, as examples. NAS server 11B also includes a plurality of automated media portals 102, such as automated media portals 102A and 102B described above. As described above, such automated media portals may each provide a different hardware interface for communicatively coupling to a different type of portable data storage media, such as the exemplary portable data storage media 405 shown in FIG. 4.

In the example of FIG. 5, one or more output devices may be included. For instance, LED 501 may be included and associated with automated media portal 102A, and LED 502 may be included and associated with automated media portal 102B. As discussed above with FIG. 3, such LEDs may be used to indicate to a user whether data transfer from a portable data storage media that is coupled to a given automated media portal to local data storage 101 is successful. For instance, in certain embodiments, automated media portal 102A may output an indication of successfully storing the data from a portable data storage media 405$_2$ to the NAS server's local data storage 101, such as by illuminating a green light on LED 501, and automated media portal 102A may output an indication of duplicative data already existing in the local data storage 101 of the NAS server, such as by illuminating a red light on LED 501.

In addition to or instead of LEDS 501-502, a display 503 may be included for outputting information to a user. For instance, as discussed above with FIG. 3, a message may be output on such display indicating whether data transfer from a portable data storage media that is coupled to a given automated media portal to local data storage 101 is successful.

Also, in certain embodiments, a limited-purpose user input mechanism (e.g., button) 406 may be included on NAS server 11B. As mentioned above, such limited-purpose user input mechanism 406 may be limited in purpose to triggering transfer of data from a portable data storage media 405 that is coupled to an automated media portal 102 to the NAS server's local data storage 101.

The above exemplary embodiments are not intended to be limiting on the scope of the invention, as defined by the appended claims. Rather, the embodiments described above are intended merely as examples to provide an enabling disclosure that supports the broader scope of the appended claims.

What is claimed is:
1. A system comprising:
   a network attached storage (NAS) server not having a general-purpose user input device;
   said NAS server comprising local data storage and a plurality of automated media portals each operable for receiving a direct communicative coupling of a portable storage media and reading data from the received portable storage media for storage to said local data storage.

2. The system of claim 1 wherein said NAS server does not have an interface for said general-purpose user input device.

3. The system of claim 1 wherein said NAS server does not have any user input device.

4. The system of claim 1 wherein said general-purpose user input device comprises any peripheral user input device.

5. The system of claim 1 wherein said general-purpose user input device comprises a keyboard.

6. The system of claim 1 wherein the plurality of automated media portals comprises:
a plurality of different automated media portals that each provide a different hardware interface for communicatively coupling to different types of said portable storage media.

7. The system of claim 6 wherein said different types of portable storage media comprise ones selected from the group consisting of:
CompactFlash cards, SmartMedia cards, MultiMediaCard, Secure Digital, MemoryStick, and universal serial bus (USB)-interfaced devices, U3 media, and Flash Memory media.

8. The system of claim 1 wherein said NAS server comprises:
a limited-purpose user input device that is operable to receive user input solely for triggering said reading of data from the received portable storage media for storage to said local data storage.

9. The system of claim 8 wherein at least one of said plurality of automated media portals is operable to perform said reading data from the received portable storage media to storage to said local data storage responsive to a user interaction with said limited-purpose user input device.

10. The system of claim 1 wherein said NAS server comprises an LED associated with at least one of the plurality of automated media portals that is operable to indicate to a user whether data received from the portable storage media is successfully stored to said local data storage.

11. A network attached storage (NAS) server comprising:
a communicative interface to a communication network;
local data storage for storing data;
a plurality of automated media portals, each operable for receiving a direct communicative coupling of a portable storage media and reading data from the received portable storage media for storage to said local storage; and
wherein said NAS server does not comprise a general-purpose user input device.

12. The NAS server of claim 11 wherein the plurality of automated media portals comprises:
a plurality of different automated media portals that each provide a different hardware interface for communicatively coupling to different types of said portable storage media.

13. The NAS server of claim 11 further comprising:
a limited-purpose user input device that is operable to receive user input solely for triggering said reading of data from the received portable storage media for storage to said local data storage.

14. A method comprising:
receiving a direct communicative coupling of a portable storage media to any of a plurality of different automated media portals of a network attached storage (NAS) server, wherein said NAS server comprises local data storage and wherein said NAS server does not include a general-purpose user input device;
said NAS server reading data from the received portable storage media; and
said NAS server storing said data to said local data storage.

15. The method of claim 14 wherein said reading and storing are performed autonomously responsive to said receiving.

16. The method of claim 14 wherein said reading and storing are performed responsive to user input to a limited-purpose user input device of the NAS server.

17. The method of claim 14 further comprising
receiving user input to a limited-purpose user input device of the NAS server to trigger said reading and storing.

18. The method of claim 14 further comprising:
pre-configuring data storage characteristics of said NAS server; and
performing said storing according to the pre-configured data storage characteristics.

19. The method of claim 18 wherein said pre-configuring data storage characteristics of said NAS server comprises:
pre-configuring a location within said local data storage to which said data is to be stored in said storing.

20. The method of claim 14 further comprising:
the NAS server determining whether said data is already stored in said local data storage; and
the NAS server not creating a new storage of said data in said local data storage when determined that said data is already stored in said local data storage.

* * * * *